US008671350B2

(12) United States Patent
Lindquist

(10) Patent No.: US 8,671,350 B2
(45) Date of Patent: Mar. 11, 2014

(54) SYSTEM AND METHOD FOR CREATING GATEWAY BETWEEN AN ANALYTICAL DATABASE AND A VIRTUAL WORLD

(75) Inventor: Benjamin Lindquist, Tallahassee, FL (US)

(73) Assignee: 3D Data LLC, Tallahassee, FL (US)

( * ) Notice: Subject to any disclaimer, the term of this patent is extended or adjusted under 35 U.S.C. 154(b) by 1118 days.

(21) Appl. No.: 12/289,193

(22) Filed: Oct. 22, 2008

(65) Prior Publication Data

US 2010/0031165 A1 Feb. 4, 2010

Related U.S. Application Data

(60) Provisional application No. 60/960,961, filed on Oct. 22, 2007.

(51) Int. Cl.
*G06F 3/00* (2006.01)
*G06F 9/00* (2006.01)
*G06F 17/00* (2006.01)

(52) U.S. Cl.
USPC .......................................... 715/757; 715/751

(58) Field of Classification Search
USPC ................................................ 715/757, 751
See application file for complete search history.

(56) References Cited

U.S. PATENT DOCUMENTS

| | | | |
|---|---|---|---|
| 5,802,296 A | 9/1998 | Morse et al. | |
| 6,091,410 A | 7/2000 | Lection et al. | |
| 6,175,842 B1 * | 1/2001 | Kirk et al. | 715/205 |
| 6,388,665 B1 | 5/2002 | Linnett et al. | |
| 6,476,830 B1 | 11/2002 | Farmer et al. | |
| 6,845,486 B2 | 1/2005 | Yamada et al. | |
| 6,867,772 B2 * | 3/2005 | Kotcheff et al. | 345/420 |
| 6,892,349 B2 | 5/2005 | Shizuka et al. | |
| 6,981,220 B2 | 12/2005 | Matsuda | |
| 7,085,773 B2 * | 8/2006 | Dorsett, Jr. | 707/755 |
| 2002/0130894 A1 | 9/2002 | Young et al. | |
| 2005/0030309 A1 | 2/2005 | Gettman et al. | |
| 2007/0011273 A1 | 1/2007 | Greenstein et al. | |

FOREIGN PATENT DOCUMENTS

WO   WO 92/09963   6/1992

OTHER PUBLICATIONS

Notification of Transmittal of the International Search Report and the Written Opinion of the International Searching Authority, or the Declaration in corresponding International Application No. PCT/US2008/011994 (Forms PCT/ISA/220, PCT/ISA/237 and PCT/ISA/210) dated Jun. 22, 2009.
http://clearnightsky.com/node/278, S&P500 Visualized in Second Life, Clear ink, submitted by Leon Atkinson on Feb. 16, 2007.
http://clearnightsky.com/taxonomy/term/8?page=5, Quick and Dirty Web Page Viewer for Second Life, Clear ink, submitted by Steve Nelson on Aug. 20, 2007.
http://theseventhsun.com/0507_dobbs2.htm, Part I, Philip Linden Headlines Developers' Conferences, Dr. Dobb's Life 2.0, Apr. 28-May 4, 2007.

* cited by examiner

*Primary Examiner* — Boris Pesin
*Assistant Examiner* — Sabrina Greene
(74) *Attorney, Agent, or Firm* — Banner & Witcoff, Ltd.

(57) ABSTRACT

Provided is a system and method for facilitating or creating a gateway to integrate with 3D virtual worlds (e.g., Second Life and Sun Wonderland) and external applications (e.g., data visualization gateways, process modeling systems, artificial intelligences, social networks, and other virtual worlds) for three-dimensional visualization of data in a virtual world. The visualization tool may include, for example, a three-dimensional graph using various colors, dimensions, shapes, and other properties as desired, to represent different data and data values. The avatars in the virtual world, as controlled by the game's players or users in the real world, can point to or otherwise interact with elements in the three-dimensional graph whereupon the base data or other related informational data would be displayed with respect to that given cell or element of the graph.

35 Claims, 10 Drawing Sheets

US 8,671,350 B2

SYSTEM AND METHOD FOR CREATING GATEWAY BETWEEN AN ANALYTICAL DATABASE AND A VIRTUAL WORLD

RELATED APPLICATION

This disclosure claims the benefit of prior Provisional Application No. 60/960,961 filed on Oct. 22, 2007, which is hereby incorporated by reference in its entirety.

FIELD

Exemplary embodiments relate generally to a system and method for creating a gateway between an analytical database and a virtual world for three-dimensional visualization of data in the virtual world.

BACKGROUND

A virtual world is an ideal framework for the visual representation of data. Sophisticated three-dimensional applications can be developed more rapidly using virtual world platforms than by using many real world alternatives. Currently, in order to build a three-dimensional graphing application which allows collaborative interaction with the graphs and without leveraging a virtual world platform, one would have to handle interaction with graphics card drivers, produce a user interface for each operating system platform desired, build a server to handle the collaborative interaction, and develop network protocols to sync the activity of multiple users and to specify the three-dimensional objects which the user interfaces are to display. Integrating Voice-over-Internet Protocol (VoIp), user authentication, and remote administration and management would add further years of work to the task.

The virtual world platform provides all of these components as standard features, which allows developers to focus on innovative ways of displaying data and providing navigation through it. Use of the third dimension, and of collaborative user experiences, has yet to be fully explored. One way to rapidly and reliably take advantage of these powerful dynamics is to build applications within virtual worlds.

A "virtual world" is a simulated three-dimensional (3D) space which includes modeled 3D objects, some of which are avatars (i.e., computer users representation of themselves, or alter egos) representing users navigating within the space. Avatars are controlled by users who are able to view the modeled space and objects via networked computers. Each user has his or her own point of view from which the scene is rendered for display. Virtual world platforms have evolved to integrate VoIp communications and sharing of traditional two-dimensional application screens. The application screens can project the content of webpages and other software.

The major virtual world platforms in the still-evolving marketplace have been built with years of architecture, programming, and testing work. The intense competition that the platforms are gearing up for guarantees the continued accumulation of robust features for application integration, communication integration, and collaboration, in addition to robustness and scalability.

Database technology has made rapid gains in recent years. Distributed systems, for example, GreenPlum and Aster, are able to perform complex queries against terabytes of data in real time. True On-Line Analytical Processing (OLAP) technology, once provided only by expensive niche systems, is now availably packaged within Microsoft SQLServer. Powerful analysis tools and a myriad of specialized business intelligence products incorporating artificial intelligence and advanced statistical algorithms are able to process vast amounts of data and produce more data in a summarized form.

Great advances in database technology have been required in order to store and query the world's increasing production of data. As companies migrate to Enterprise Resource Planning (ERP) systems, integrated databases will be used to collect information on all aspects of their operations. As governments become more concerned with security, they tend to look to financial records, agency records, and other data sources as a means of detecting terrorist activity. Collecting, storing, and querying data is relatively straightforward. However, the analysis and/or interpretation of the data may not be.

SUMMARY

The disclosed exemplary embodiments facilitate or create a gateway between an analytical database and a virtual world for three-dimensional visualization of data in the virtual world. The visualization tool may include, for example, a three-dimensional graph using various colors, dimensions, shapes, and other properties as desired, to represent different data and data values. An avatar in the virtual world, as controlled by the game's player or user in the real world, can point to or otherwise interact with elements in the three-dimensional graph whereupon the base data or other related informational data would be displayed with respect to that given cell or element of the graph. The type of graph is relatively unlimited and may include 3D bar graphs, line graphs, pie charts, topographic maps, and other graphical representations as desired. An avatar can move about the graph and interact with it at various points in 3D virtual space.

An exemplary embodiment is directed to a method of establishing a gateway between a database and a virtual world. The method comprises receiving one or more query strings and one or more parameters at a gateway that is located between a virtual world and a database that is outside the virtual world, retrieving data by the gateway, from the database at the gateway, the data being based on the one or more query strings, generating a visual representation at the gateway, the visual representation being based on the retrieved data and the one or more parameters, and sending a data signal for displaying the generated visual representation in the virtual world.

According to exemplary embodiments, a method for injecting and controlling content from an application into a virtual world may comprise placing content in a virtual world by an application implementing a protocol, receiving one or more messages from the content when the content is interacted with, and responding to the one or more messages by causing one or more changes in the content and/or by producing additional content.

According to exemplary embodiments, a method for injecting and controlling content from an application into a virtual world may comprise providing an application implementing a protocol that interfaces with a gateway between a database and the virtual world for placing content in the virtual world, querying the database by the gateway using a database query string, obtaining data from the database by the gateway based on the database query, sending the obtained data to the application implementing the protocol, building a visual representation based on the obtained data, and available interactions associated with the visual representation by the application implementing the protocol, and rendering the visual representation and the associated available interactions in the virtual world.

According to exemplary embodiments, a method of injecting and streaming content control from an application into a virtual world may comprise placing content in a virtual world by an application implementing a protocol, receiving one or more messages from the content based on at least one of user interaction, changes in data, and receiving new data, and streaming content control based on the received one or more messages to cause one or more changes in the content.

BRIEF DESCRIPTION OF THE DRAWINGS

Exemplary embodiments will be more clearly understood from the following detailed description taken in conjunction with the accompanying drawings. FIGS. 1-9 represent non-limiting, exemplary embodiments as described herein.

FIG. 2 is a flowchart illustrating a graph generation process of a gateway in accordance with exemplary embodiments;

FIG. 3 is a flowchart illustrating a process of generating parameters by an assistant object in accordance with exemplary embodiments;

FIG. 4 is a flowchart illustrating a setup of objects and variables in accordance with exemplary embodiments;

FIG. 5 is a flowchart illustrating a method of building a query string for setting cell attributes in accordance with exemplary embodiments;

FIGS. 6-8 are graphs illustrating three-dimensional visualization of data in a virtual world in accordance with exemplary embodiments; and FIG. 9 is a graph illustrating three-dimensional visualization of data in a virtual world in accordance with exemplary embodiments.

DETAILED DESCRIPTION

For simplicity and illustrative purposes, the principles of the invention are described by referring mainly to exemplary embodiments thereof.

Figure 1A:
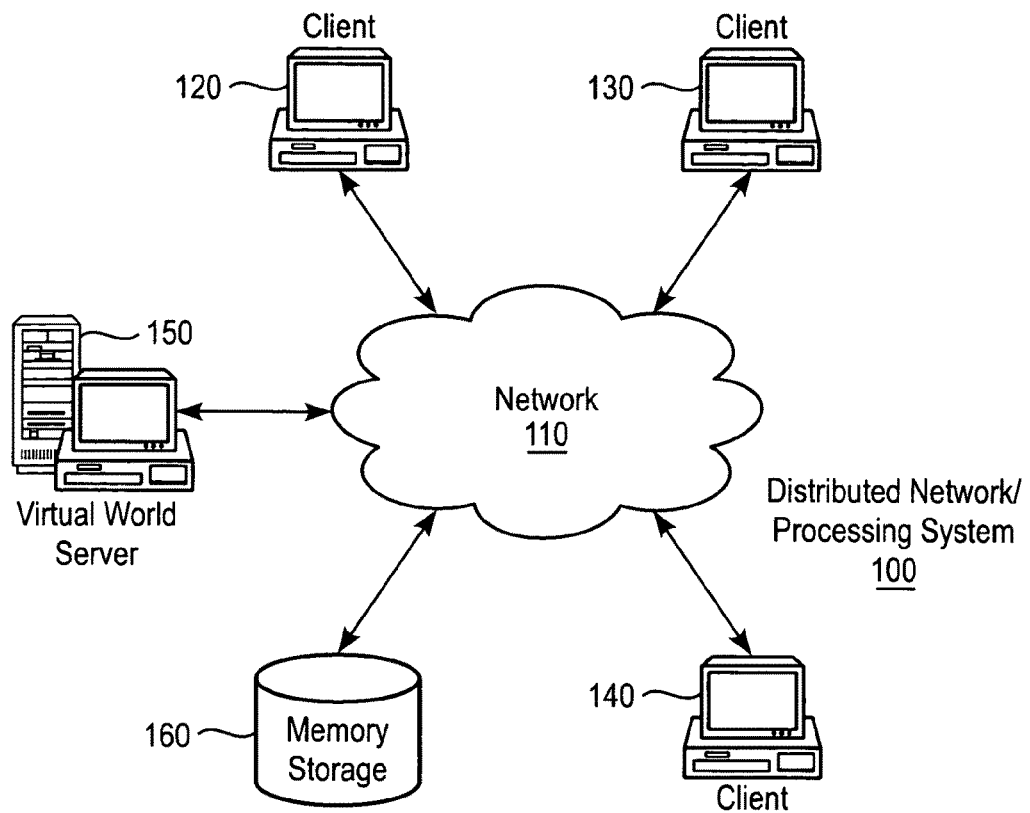
FIG. 1A is a diagram illustrating a distributed network/processing system in which exemplary embodiments may be implemented.

FIG. 1 is a diagram illustrating a distributed network/processing system 100 in which exemplary embodiments may be implemented. The distributed network/processing system 100 may include a network 110 providing communication links between various devices and computers (e.g., clients 120, 130, 140, server 150, and memory/storage 160) connected together within the distributed network/processing system 100.

Figure 1B:
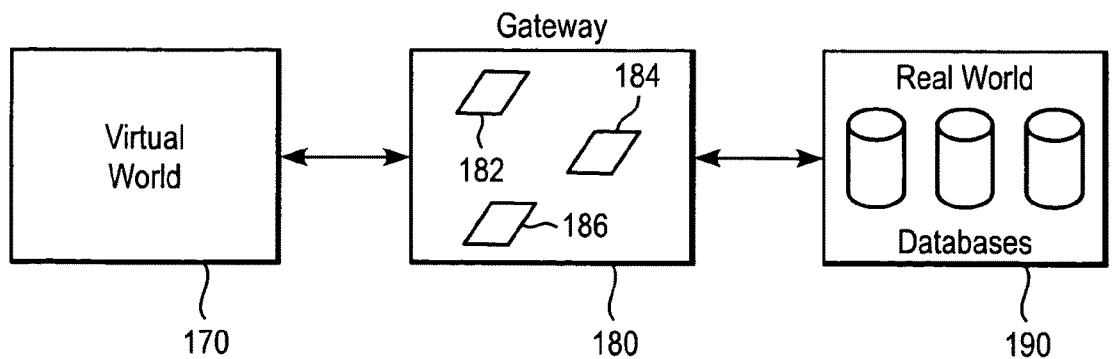
FIG. 1B is a diagram illustrating a system environment for implementing a gateway in accordance with exemplary embodiments.

FIG. 1B is a diagram illustrating a system environment for implementing a gateway in accordance with exemplary embodiments.

Referring to FIG. 1B, the system environment 165 can include a virtual world 170, a gateway 180, and an analytical database 190. The gateway 180 can be created so that it is located between the analytical database 190 and the virtual world 170. The analytical database 190 can include, but is not limited to, a structured collection of records or data that is stored in a computer system. The data can be structured in any suitable manner, such as a table, spreadsheet, or any other suitable implementation as desired.

Various processes and methods, as are discussed in the description that follows, can be executed in the system environment 165 to allow for data existing in databases 190 located outside the virtual world 170 to be visualized in the virtual world 170. These methods can be executed through the use of APIs (application program interfaces) in object oriented languages, or through any other suitable software implementation. The virtual worlds can include, but are not limited to, Second Life, There, World of Warcraft, Sun Wonderland, OLIVE, Qwaq, OpenSim, realXtend, and other known implementations as desired.

Figure 1C:
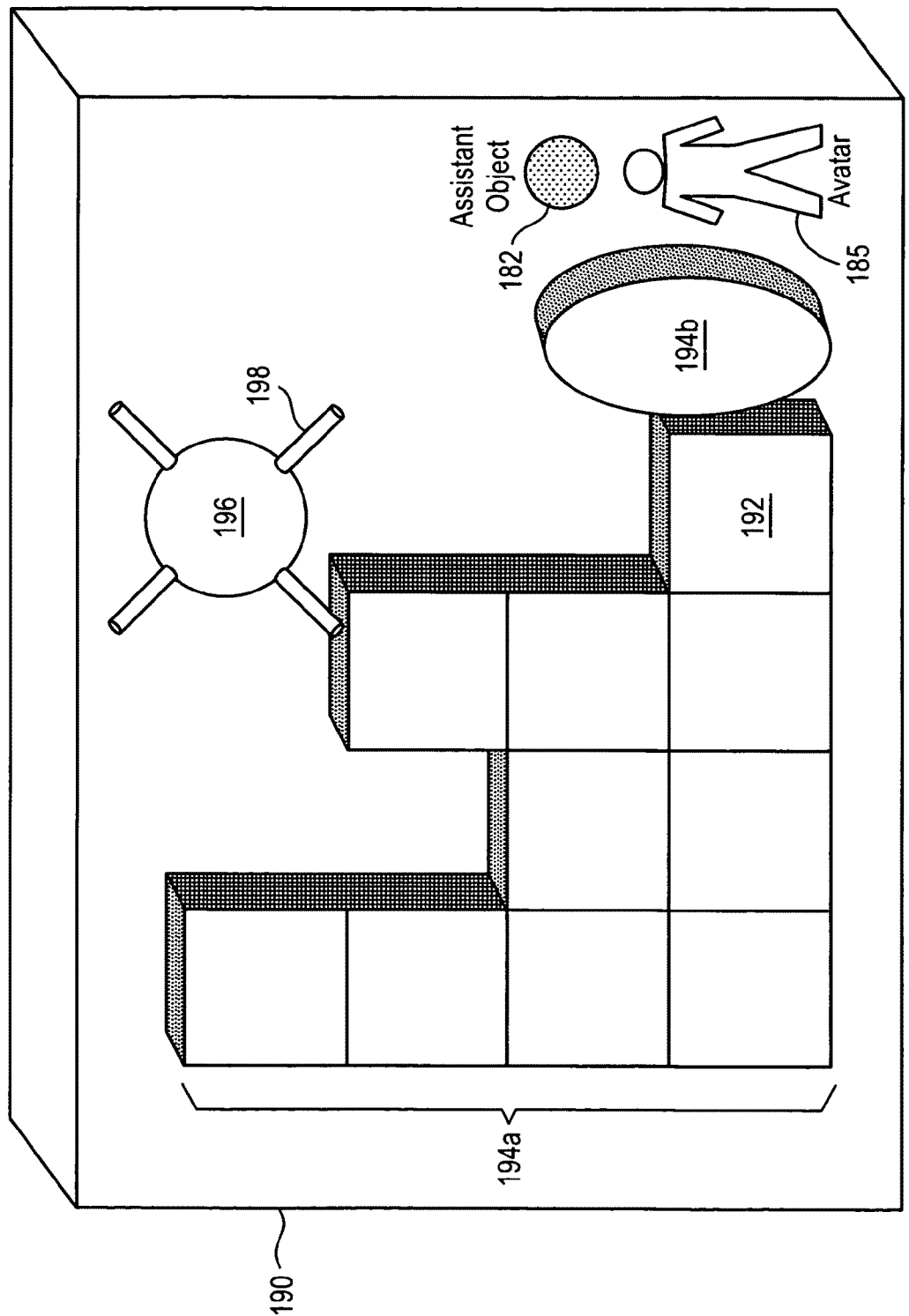
FIG. 1C is a diagram illustrating a database in accordance with an exemplary embodiment.

FIG. 1C is a diagram illustrating a database in accordance with an exemplary embodiment. The database 190 is represented in the virtual world 170 as a large semi-transparent cube. Within the cube are representations of the tables or OLAP cubes contained within the database 190. A table 192 is represented by a string (i.e., multiple 3D geometrical shapes of roughly the same size arranged in a straight line) of columns. A column 194 is represented by a 3D geometric shape corresponding to its data type. For example, numeric data type columns are cubes 194a and character type columns are ovoids 194b (i.e., any curve resembling an egg or an ellipse).

Business objects 196 are represented by spheres with thin cylinders, or "filaments" (i.e., visible threads of control in a virtual world), projecting out and attaching at the other end to the representations of database columns. A filament 198 is rezzed (i.e., made to appear from inventory on the land) in the virtual world when an avatar clicks something, and goes from what was clicked to the avatar. Filaments 198 may be used as actual functioning elements of a 3D user interface. An avatar 185 may have either zero or one filament.

The user builds a query by rezzing (i.e., making an object appear from inventory on the land or creating a brand new item, for example, by a right mouseclick and choosing "create") out a query object and then attaching filaments from the query object to objects representing columns. This action automatically produces filaments coming out of the query, which represent the result dimensions of the query. The other end of the query filaments can be attached to mid-processor object filaments. Mid-processors may include statistical projection objects, re-sorting objects, aggregators, unioners, and other suitable representations as desired. Mid-processors can also be mapped to other mid-processors.

A machine virtual gateway terminates with one or more visualization objects and the input filaments of the visualization objects correspond to the "physical" dimensions of the resulting visualization. Physical dimensions are characteristics of the 3D content that the visualization produces, for example, size, placement, color, height, and other characteristics as desired.

Once the machine is constructed, the user can activate the gateway 180 via the machine to query the data, perform the mid-processing steps, and render the 3D visualizations within the 3D environment. In one exemplary embodiment, the gateway 180 can be activated by a command (totem_rez) that is sent from the virtual world to the gateway, which contains the instructions. In another exemplary embodiment, the gateway 180 can be activated through 3D user interface that includes a representation of the database itself, the objects the gateway can use to transform the data, and the filaments that connect them. In still another exemplary embodiment, the gateway 180 can be activated through a configuration file that resides on the gateway using a Content Injection and Control Protocol, for example. The gateway 180 may include an assistant object 182, a servlet 184, and a gridcell object 186. The assistant object 182 is a virtual world object facilitating user control of the gateway. The servlet 184 provides access to the gateway 180 via the HTTP internet protocol. The gridcell object 186 is a virtual object that represents one node in a graph.

Figure 2:
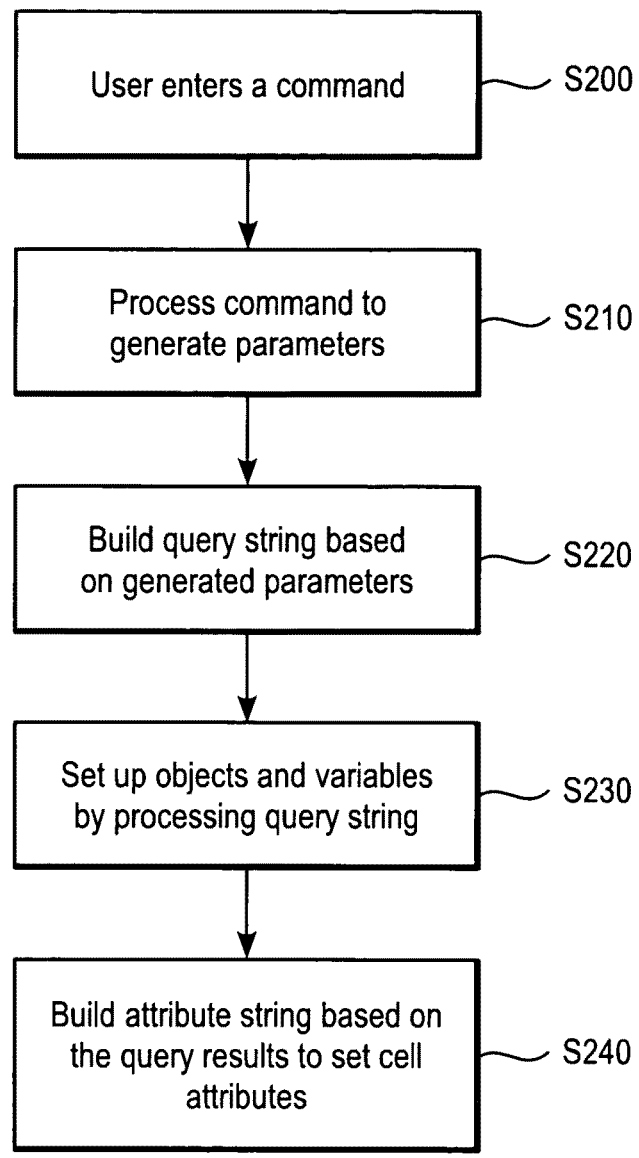

FIG. 2 is a flowchart illustrating a graph generation process of a gateway in accordance with exemplary embodiments. Table 1 is the pseudo code for illustrating the graph generation process of the gateway.

The gateway uses parameters to generate the graph. The parameters may be received from the user in real time or may be retrieved from a configuration file. The parameters can include an SQL query, a cell size, a style of graph, and a string describing the units being measured (such as "inches" or widgets"). In the style of graph specified is a 3D histogram, consisting of a grid of cells, the heights of which exemplary embodiment vary based on the value being measured. One of ordinary skill will appreciate that the graph being generated is not limited to this example, and can include various other suitable formats as desired.

Referring to FIG. 2 and Table 1, in Step 200, a user enters a command at the client. For example, the user enters "totem_rez 1 grid yards 0.5 {select year, year, team, team, sum(p-assyd) from seasons where year>1978 group by year, team order by year, team}." In Step 210, the command is processed by the assistant object 182 to generate various parameters. The parameters are not limited to being received in real time, but may also be received from a configuration file, for example. In Step 220, query strings are built based on the generated parameters. In Step 230, the requisite objects and variables are set up by processing the query strings. In Step 240, an attribute string is built based on the query results to set the cell attributes.

Figure 3:
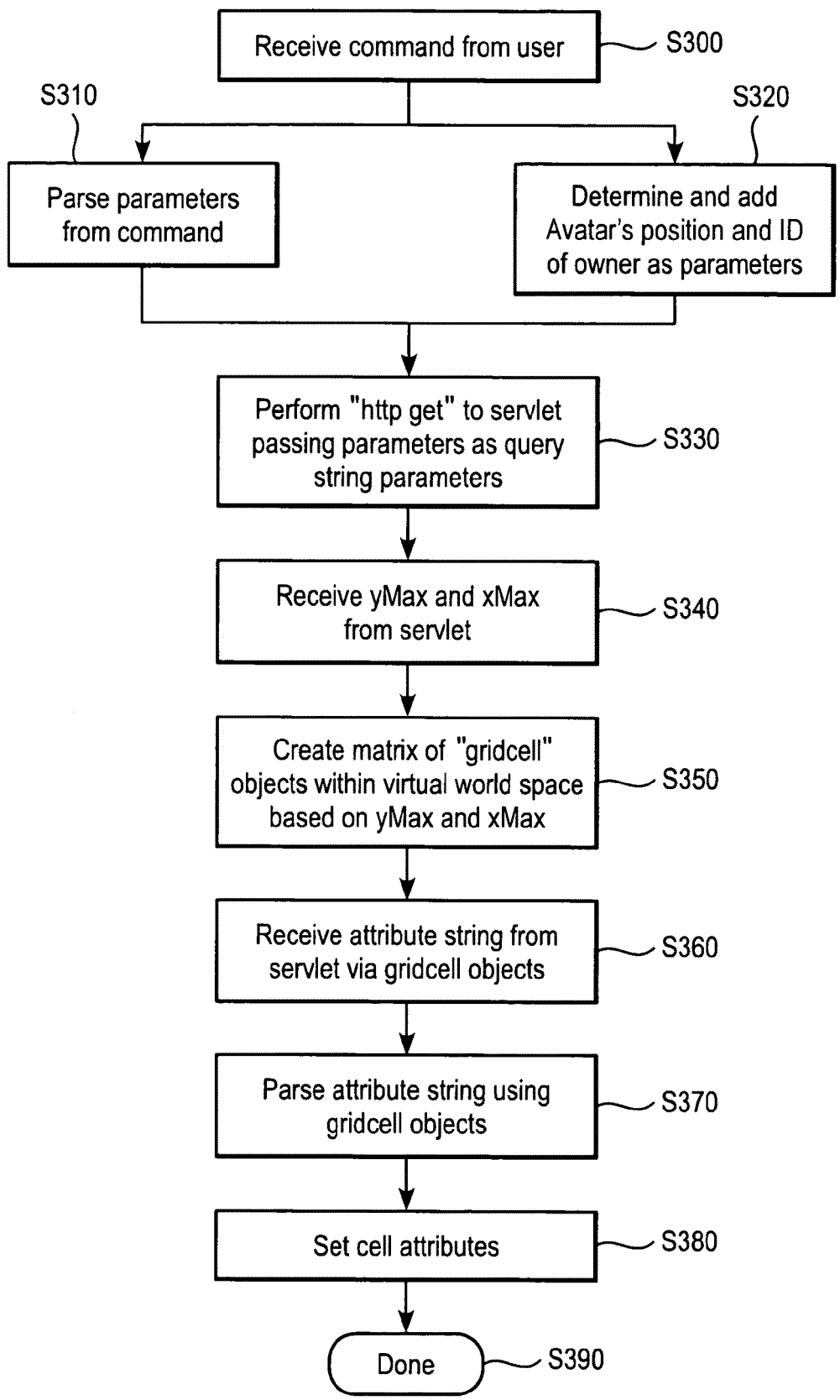

FIG. 3 is a flowchart illustrating a process of generating parameters by the assistant object in accordance with exemplary embodiments. Referring to FIG. 3, the assistant object 182 (e.g., sphere hovering over the avatar's head) listens to its owner, which is the avatar associated with the user, and receives the "totem_rez" command for processing in Step 300. In Step 310, the assistant object parses the parameters out of the command. The parameters may include an identifier for this query, grid (e.g., the style of visualization to use for this query), yards (e.g., the units that are measured, which will be used in the titles of the cells), and 0.5 (e.g., the width of the cells). In Step 320, the assistant object determines its current x and y position and adds the position as a parameter, in addition to the identification (ID) of its owner as a parameter. In Step 330, the assistant object performs an "http get" to the servlet (e.g., java code that is a part of the system, and hosted on a server separate from the virtual environment and accessible via the Internet), to pass all parameters as query string parameters to the servlet via the Internet.

Figure 4:
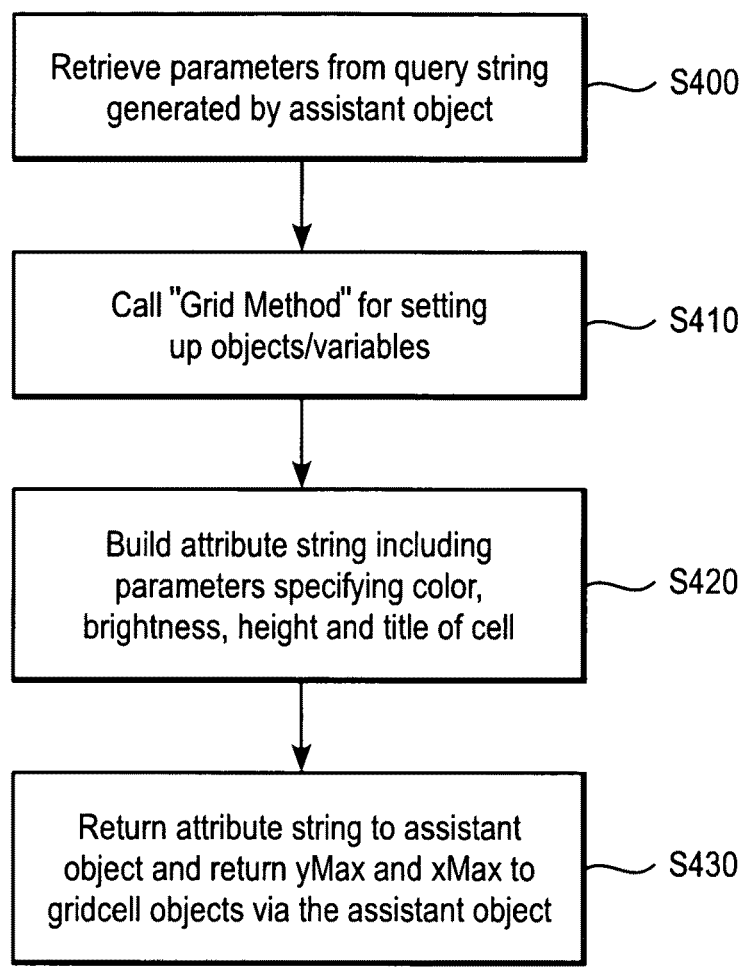

FIG. 4 is a flowchart illustrating a setup of objects and variables in accordance with exemplary embodiments. Referring to FIG. 4, in Step 400, the servlet retrieves all parameters from the query string generated by the assistant object. In Step 410 (Step 230 of FIG. 2), the servlet calls a method (e.g., "grid method") corresponding to the style of visualization specified. The grid method sets up the requisite objects/variables and executes the SQL (Structured Query Language) query using JDBC (Java Database Connectivity).

The gateway can set up the following objects/variables:
a hash table for storing cell attributes for this owner and query, called cells;
a linked list for storing GridValSingle objects corresponding to unique y-id values, called yList;
a linked list for storing GridValSingle objects corresponding to unique x-id values, called xList;
a hash table for storing GridValSingle objects corresponding to unique y-id values, called yVals;
a hash table for storing GridValSingle objects corresponding to unique x-id values, called xVals;
a variable for holding least value of metric column, called allMin;
a variable for holding greatest value of metric column, called allMax;
a linked list for storing GridValBoth objects corresponding to all rows, called allList; and
a hash table for storing GraphNode objects, called nodeCache.

Figure 5:
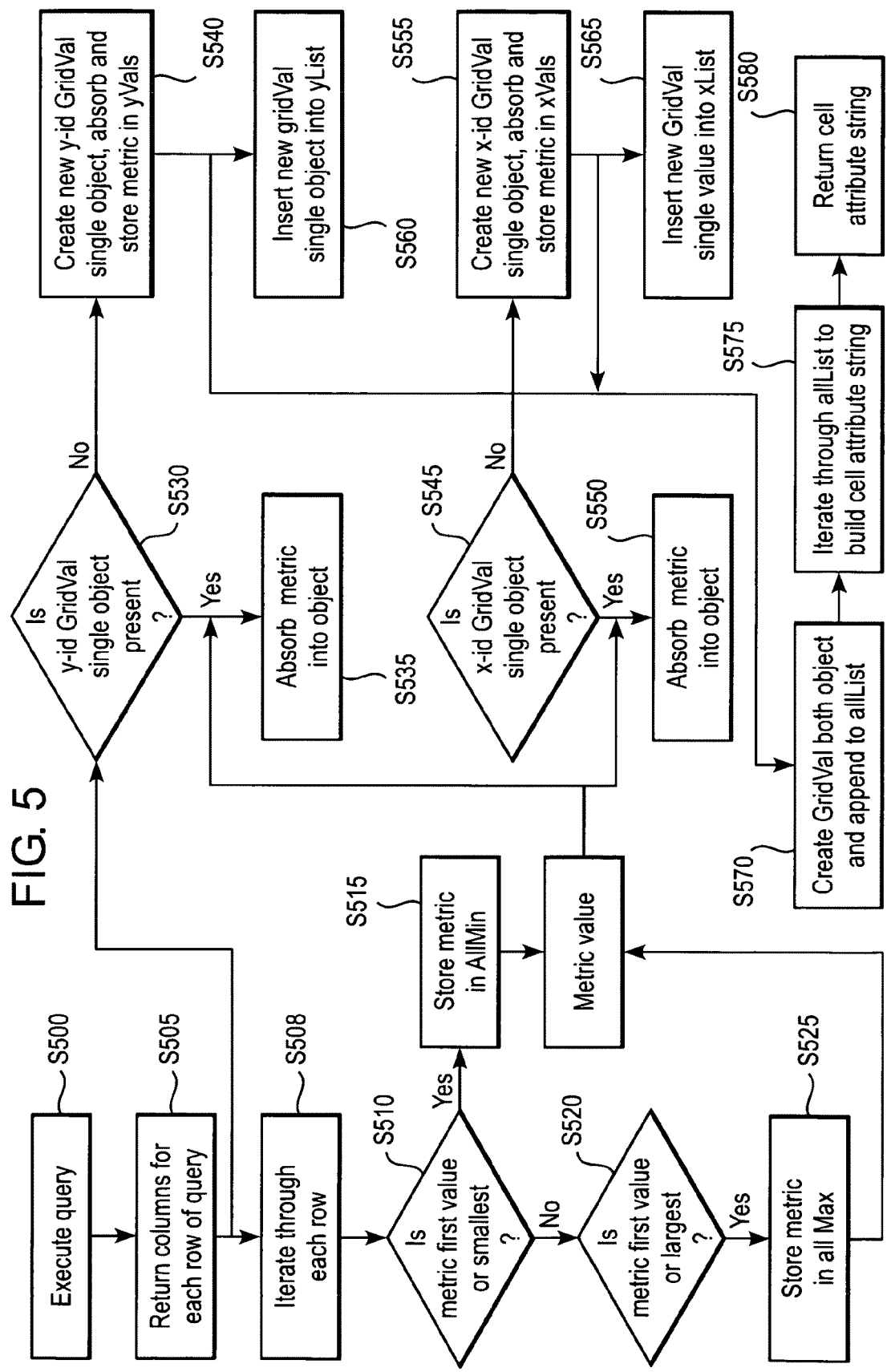

FIG. 5 is a flowchart illustrating a method of building a query string for setting cell attributes via the grid method in accordance with exemplary embodiments.

Referring to FIG. 5, in Step 500, the SQL query may be executed by the grid method using JDBC. In executing the grid method, the servlet returns five columns for each row of the query (e.g., y-id (year, in this case), y-label (year as well), x-id (team, in this case), x-label (team also), and metric (sum of passyd in this case)) in Step 505. In Step 508, the servlet iterates through the rows. In Step 510, if metric is the first value, or the smallest so far, it is stored in allMin variable in Step 515. In Step 520, if metric is the first value, or the largest so far, it is stored in allMax variable in Step 525. In Step 530, an existing GridValSingle object for y-id is looked up from yVals hashtable (y-id is key, GridValSingle object is value). If present, metric is "absorbed" (i.e., added to the accumulating total within the object) into existing GridValSingle object in Step 535. In Step 540, if it is not present, a new GridValSingle object for this y-id is created, and metric is absorbed into the new object and stored in yVals. The new GridValSingle object is inserted into yList such that the order is ascending by y-id in Step 560.

In Step 545, an existing GridValSingle object for x-id is looked up from xVals hashtable (x-id is key, GridValSingle object is value). If it is present, metric is absorbed into the existing GridValSingle object in Step 550. If it is not present, a new GridValSingle object for this x-id is created, and metric is absorbed into the new object and stored in xVals in Step 555. The new GridValSingle object is inserted into xList such that the order is ascending by x-id in Step 565.

In Step 570, a new GridValBoth object with the y-id and x-id GridValSingle objects used above is created and appended to allList. Sequential integer IDs (y-index) are assigned to the GridValSingle objects in yList and sequential integer IDs (x-index) are assigned to the GridValSingle objects in xList. In Steps 575 and 580 (Step 240 of FIG. 2 and Step 420 of FIG. 4), the GridValBoth objects stored in allList are iterated through to build a string containing attribute parameters (e.g., color, brightness, height, and title of cell). The string in the cells hashtable corresponding to this owner is stored, and ID (keyed by y-index and x-index) is queried.

In Step 430 of FIG. 4, the servlet returns the attribute string and the value of the highest y-index (e.g., yMax) and the value of the highest x-index (e.g., xMax) to the assistant object as a result of "http get."

Referring back to FIG. 3, in Step 340, the assistant object receives the yMax and xMax values. In Step 350, the assistant object creates a matrix of "gridcell" objects within the virtual world space, positioning them in a grid pattern such that each cell is as wide as the original "width" parameter in the command specified, and ranging from 1 to yMax along the y axis and 1 to xMax along the x axis. Each gridcell object is passed the ID of the query (as specified in the original parameter), builds a query string specifying owner, query ID, y position of itself, and x position of itself, and performs an "http get" over the Internet to the servlet passing the query string. The servlet determines y-ID and x-id of the cell, and looks up cell attribute string from the cell hashtable corresponding to this owner and the query ID using y-id and x-id as the key.

In Step 360, the gridcell object receives the cell attribute string from the servlet as a result of "http get." In Step 370, the gridcell object then parses the attribute string and sets its attributes (e.g., brightness, height, and title) accordingly in Step 380.

In Step 390, once the gridcell object is passed the ID of the query and parses the attribute string to set the cell attributes, the assistant object is done and returns to its original position of hovering above the head of the avatar, which corresponds to a user.

TABLE 1

Pseudo code illustrating the graph generation process of the Gateway

1) User types command as chat text; as an example: totem_rez 1 grid yards .5 {select year, year, team, team, sum(passyd) from seasons where year > 1978 group by year, team order by year, team}
2) The "assistant" object (green sphere hovering over avatar's head, for example) is listening to its owner, and receives the "totem_rez" command
3) assistant object parses the parameters out of the command
    1: an identifier for this query
    grid: the style of visualization to use for this query
    yards: the units that are measured (will be used in the titles of the cells)
    .5: the width of the cells
    {...}: SQL statement
4) assistant object determines its current x and y position and adds those as parameters; also adds the ID of its owner as a parameter
5) assistant object performs an http get to the servlet (java code that is part of the system, hosted on a server separate from the virtual environment and accessible via the Internet), passing all parameters as query string parameters
6) servlet retrieves all parameters from the query string, and calls a method corresponding to the style of visualization specified ("grid" in this case)
7) grid method sets up the following objects/variables:
    hash table for storing cell attributes for this owner and query, called cells
    linked list for storing GridValSingle objects corresponding to unique y-id values, called yList
    linked list for storing GridValSingle objects corresponding to unique x-id values, called xList
    hash table for storing GridValSingle objects corresponding to unique y-id values, called yVals
    hash table for storing GridValSingle objects corresponding to unique x-id values, called xVals
    variable for holding least value of metric column, called allMin
    variable for holding greatest value of metric column, called allMax
    linked list for storing GridValBoth objects corresponding to all rows, called allList
8) grid method executes the sql query, using jdbc
9) five columns are returned for each row of the query: y-id (year, in this case), y-label (year as well), x-id (team, in this case), x-label (team also), and metric (sum of passyd in this case); grid method iterates through the rows
    (within row loop)
    a) if metric is the first, or the smallest so far, store in allMin variable
    b) if metric is the first, or the largest so far, store in allMax variable
    c) look up existing GridValSingle object for y-id, from yVals hashtable (y-id is key, GridValSingle object is value)
        if present, "absorb" metric into existing GridValSingle object
        if not present, create new GridValSingle object for this y-id, absorb metric into it, and store in yVals
        insert new GridValSingle object into yList such that order is ascending by y-id TABLE 1-continued Pseudo code illustrating the graph generation process of the Gateway d) look up existing GridValSingle object for x-id, from xVals hashtable (x-id is key, GridValSingle object is value)
        if present, absorb metric into existing GridValSingle object
        if not present, create new GridValSingle object for this x-id, absorb metric into it, and store in xVals
        insert new GridValSingle object into xList such that order is ascending by x-id
    -->"absorb" means to add metric to an accumulating total within the object, and keep track of both least and greatest metrics absorbed
    e) create a new GridValBoth object with the y-id and x-id GridValSingle objects used above
    f) append the GridValBoth object to allList
(end row loop)
10) assign sequential integer IDs (y-index) to the GridValSingle objects in yList
11) assign sequential integer IDs (x-index) to the GridValSingle objects in xList
12) iterate through the GridValBoth objects stored in allList
(within allList loop)
    a) build a string containing parameters specifying color, brightness, height, and title of cell, such that:
        brightness = colorBmin + (colorBmax − colorBmin) * (gvb.height − gvb.yVal.min) / (gvb.yVal.max − gvb.yVal.min)
        (brightness is proportional to the greatest metric in this row)
        height = minHeight + (maxHeight − minHeight) * (gvb.height − allMin) / (allMax − allMin)
        (height is proportional to the greatest metric overall)
        title = gvb.xVal.label + ": " + gvb.yVal.label + ": " + gvb.height + " " + units
    b) store the string in the cells hashtable corresponding to this owner and query ID, keyed by y-index and x-index
(end allList loop)
13) return the value of the highest y-index (call it yMax) and the value of the highest x-index (call it xMax) to the assistant object as result of http get
14) assistant object creates a matrix of "gridcell" objects within the virtual world space, positioning them in a grid pattern such that each cell is as wide as the original "width" parameter in the command specified, and ranging from 1 to yMax along the y axis and 1 to xMax along the x axis; each gridcell object is passed the ID of the query, as specified in the original parameter
15) create a Graph object storing all parameters of this graph, and containing the nodeCache
16) assign a graph ID (sequential number uniquely identifying each graph generated by the gateway)
17) store the Graph object in a hash table (the "Graph Cache") keyed by graph ID
18) assistant object is done and returns to its owner
19) each gridcell object performs the following:
    a) build a query string specifying owner, query ID, y position of itself, and x position of itself
    b) perform an http get over the Internet to the servlet, passing query string
    c) servlet determines y-id and x-id of cell as follows:
        int y-id = (int)Math.round((yPos − ld.startY) / ld.cell_size)
        int x-id = (int)Math.round((xPos − ld.startX) / ld.cell_size)
        (IDs are determined by working backward from virtual world position, using query start y and x positions originally passed by assistant object)
    d) servlet looks up cell attribute string from cells hashtable corresponding to this owner and query ID, using y-id and x-id as key
    e) servlet returns attribute string to gridcell object as result of http get
    f) gridcell object parses attribute string and sets its brightness, height, and title accordingly
20) done.

Figure 6:
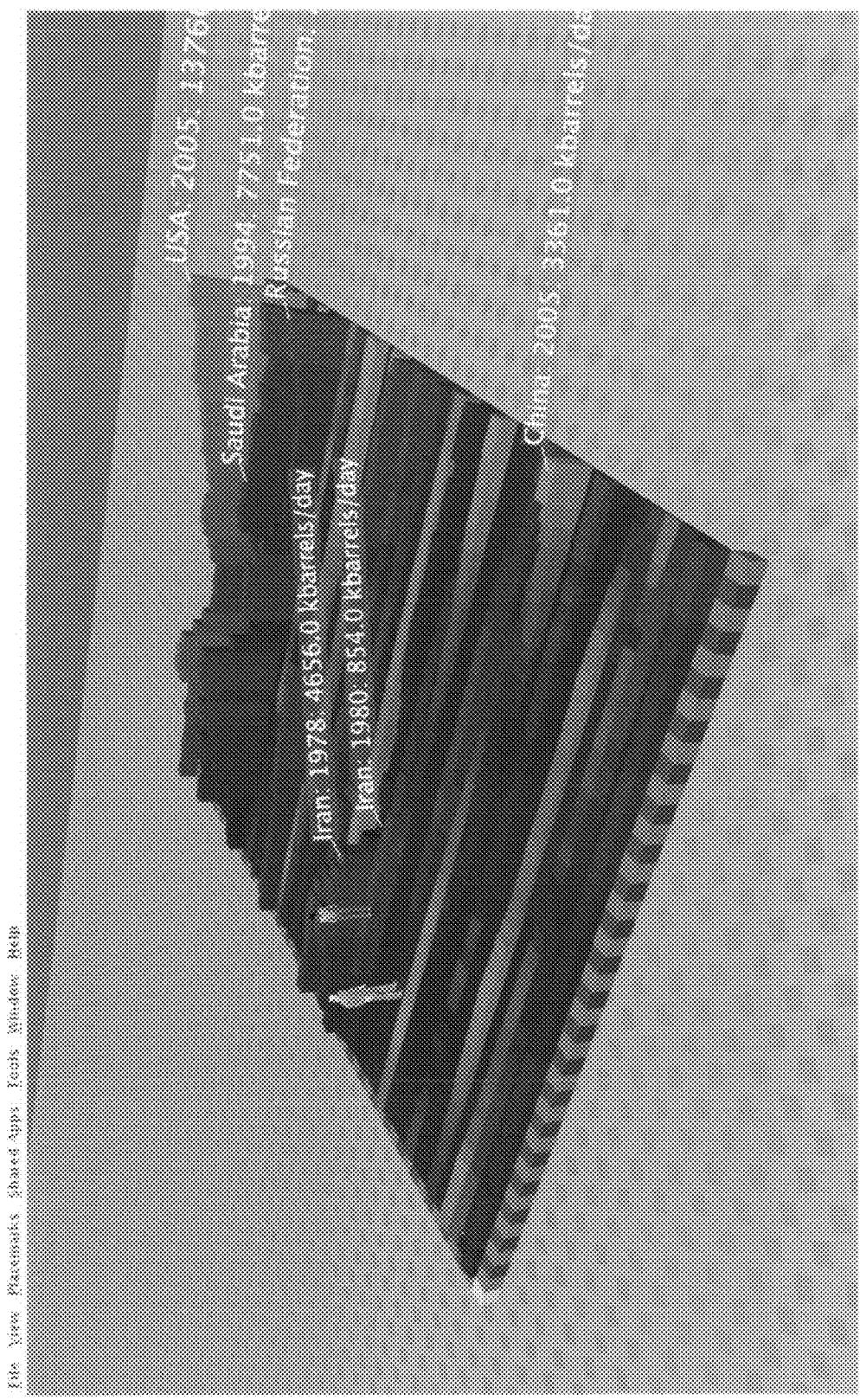
Figure 7:
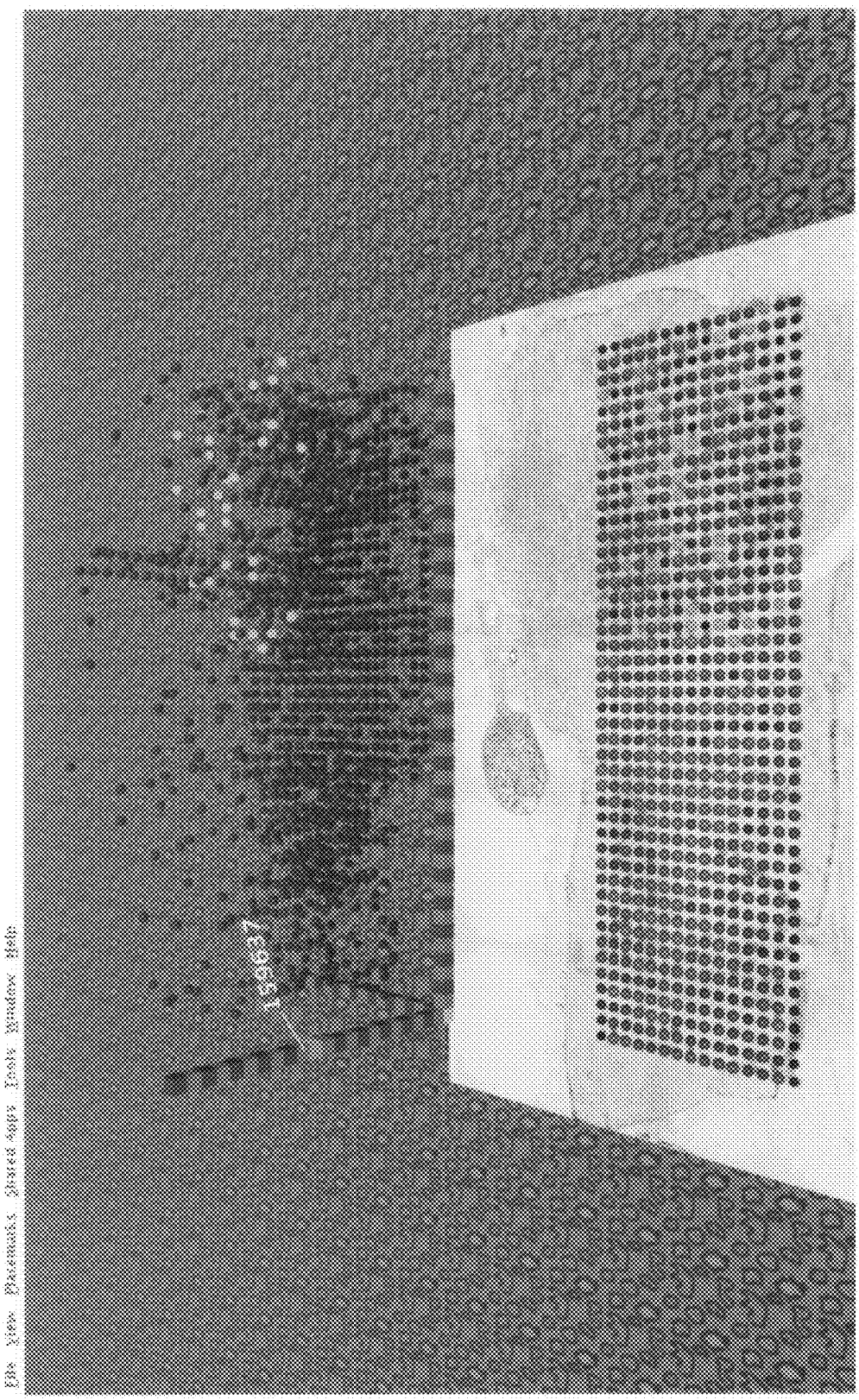
Figure 8:
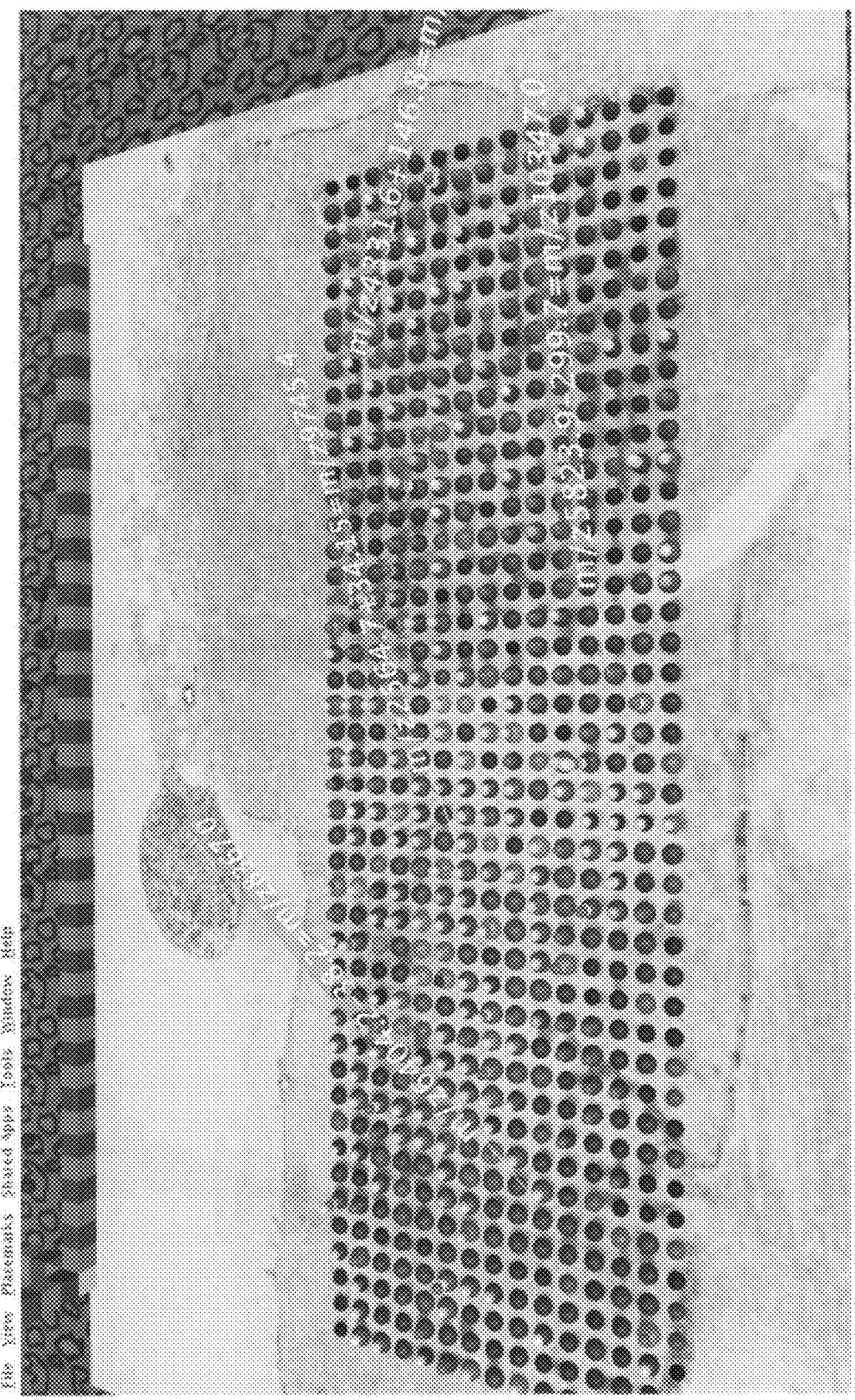

FIGS. 6-8 are graphs illustrating three-dimensional visualization of data in a virtual world in accordance with exemplary embodiments. The exemplary data includes statistics of an oil company that were placed in a database. The gateway queried the database to produce the graph illustrated in FIG. 6. The graph was placed into an instance on Sun Wonderland by the gateway, using CICP. Data in the graph may be distinguished through the use of various colors. For example, the cube that designates 'China' may identify a net consumption (negative production), and may be red in color. The cube that designates 'Iran' may identify a positive net production, and may be blue in color.

In this example, the dimensions of the graph may be identified as follows: the axis sloping downward from left-to-right corresponds to years; and the axis sloping upward from left-to-right corresponds to country. These axes create a grid of cells; the height of each cell corresponds to the net oil production of that country for that year. The cube at which the two axes meet may identify the origin and may be green in color. The avatars of two other users may be visible standing on the graph.

FIGS. 7-8 are graphs that are based on the same data represented in FIG. 6. FIGS. 7 and 8 use ovoids with attached business objects to represent the queried data.

Figure 9:
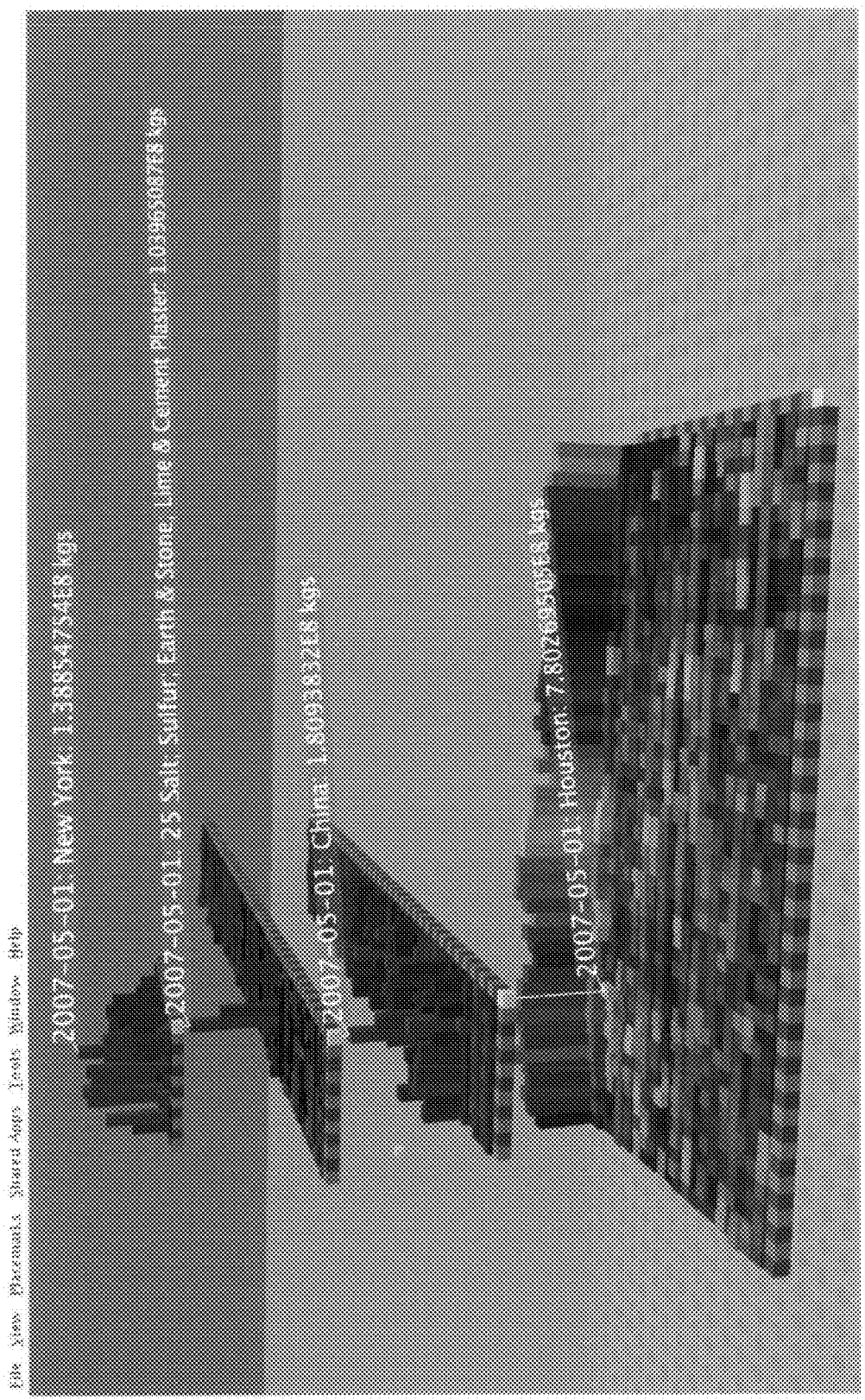

FIG. 9 is a graph illustrating three-dimensional visualization of data in a virtual world in accordance with exemplary embodiments. In this example, the exemplary data includes statistics of a mining company that was placed into a database. The gateway queried the database to produce the graphs as illustrated. As discussed above, the dimensions and attributes of each graph may be represented through the use of various colors as desired.

In an exemplary embodiment, an external application may perform a sequence of steps to render a 3D graph of data obtained via a gateway into a virtual world as described below. A menu may be presented to a user in the virtual world when the user clicks a node within the graph, which then may render another graph into the world when the user selects an option from the menu. For example, the steps may include transmitting definitions of content (including selection of events to be listened to and communicated back), rendering content in the virtual world, forwarding selected events on to an external application, and upon receiving of a click event on the menu option, using an external application to transmit definitions or information of the new graph.

The protocol listed above can support the establishment of sessions, transmission of content, and messaging between the content and the external application which generated it. The language is the means by which interaction events involving the content can be defined and selected for messaging.

While it is possible, and in some cases preferable, to implement the protocol and language within the virtual world itself, it is also possible to implement them in the form of a gateway to the virtual world. The gateway technique may involve using a customized version of the virtual world client software to respond to and manage Content Injection and Control Protocol (CICP) sessions, and translate CICP activity into actions within the virtual world and virtual world events into CICP messages.

The foregoing exemplary embodiments will be described with respect to the following examples.

In a first example, a database includes football statistics provided in a 'seasons' table and a 'players' table. The 'seasons' table may include three columns (e.g., player_id (type integer), year (type integer), and pass_yards (type integer)) and the 'players' table may include two columns (e.g., 'player_id' and 'player_name'). The database may reside on a database server. In addition, a "gaming server", or "virtual world server," has been set up in a location that is remote to the database server. The user has a client that allows him or her to enter the virtual space through an avatar.

A gateway may be configured to connect to the database and to the virtual world server. The game client and server may be configured to allow the user to direct his or her avatar to create various objects within the space, in particular relationship objects (represented by blue spheres, for example), query objects (represented by 3D question marks, for example), statistical projection objects (represented by a Swami in lotus position, for example), and grid-style visualization objects (represented by a grid of blue cubes of various heights and brightnesses, for example). The user is also able to create new filaments (represented by thin cylinders or strings, for example), and attach filaments to objects or to other filaments.

The gateway may query the metadata (specifically the structures of the two tables above) from the database, and create a translucent cube inside the virtual world, labeled with the name of the database. Inside the cube, the gateway may create two representations of tables (e.g., one is three cubes side by side labeled "player_id", "year", and "pass_yards", and the other is a cube and an ovoid side by side labeled "player_id" and "player name").

The first task the user may perform is to define a relationship between the two tables, by creating a relationship object, creating two filaments and attaching one end of each to the relationship object, and the other ends to the two player_id columns.

The user then creates a query object and three filaments, and attaches each filament to the query object. The remaining filament ends are attached to the year column object, the pass_yards column object, and the player_name column object. Each filament attached to a column object causes another filament to sprout from the other side of the query object, labeled with the name of the column.

The user may then create a statistical projection object labeled "projection axis" that appears with a new filament already attached to it. The user attaches the free end of this filament to the filament coming from the query object labeled "year." The statistical projection object may project imaginary values of the number of queried values that are input. In this example, the statistical projection object may be, but is not limited to, projecting imaginary values amounting to 10% of the number of queried values that are input. Once the projection axis filament is attached, the user attaches the other filaments to the projection object, which sprouts a filament for each (also for the original attachment—year).

The user may create a grid-style visualization object, which includes three filaments already attached and labeled "x", "z", and "height." The user attaches "x" to "player_name," "z" to "year," and "height" to "pass_yards." The visualization object may have a menu option when right-clicked, called "render". The user selects this option.

Every activity by the user thus far has caused the game server to communicate to the gateway, and the gateway has created objects and mappings within itself which correspond to the objects and connections in the virtual space. The objects in the gateway, such as statistical projection objects, may include programming code which queries, statistically projects, and constructs visualizations of data. Upon selection of the "render" option, the virtual world server may command the gateway to run the "machine" that the user has built. This machine queries all the player records from a join of the seasons and players tables.

In this example, statistical data from years 1970 to 1990 is stored in the database. The statistical projection object can project out the statistical data for three additional fictional years through any of a number of known algorithms as desired. Finally, the gateway may transmit commands to the virtual world server which cause a grid of cubes representing the passing yards of all players by year, arranged with year as the z axis and player name as the x axis. The height of each cube may correspond to the passing yardage.

In a second example, an application may create a 3D graph from stock market data and may allow for a display of a graph within a virtual world, for example, Second Life or an instance of Sun Wonderland. The graph may include five rectangular solids arranged in a row and representing yearly average price of a given stock over five consecutive years. When one of the rectangular solids is clicked, a menu facing the user may pop up above it and offer two options, "zoom" and "exit." When the user selects the "zoom" menu option, a message may be sent back to the gateway from the virtual world. The gateway then may create and display another graph above the first one. The graph may contain four rectangular solids arranged in a row and represent average quarterly stock price of the given stock for each quarter of the year corresponding to the rectangular solid the user clicked.

In this example, the system may include the application which creates the graphs (e.g., a Java application—the "application"), a SQL database containing average stock prices for one or more stocks by quarter for at least five years (e.g., the "database"), an adapter which communicates with the application using CICP/CIL and which generates the graphs within Second Life (e.g., the "Second Life Adapter"), and/or an adapter which communicates with the application using CICP/CIL and which generates the graphs within Sun Wonderland (e.g., the "Wonderland Adapter").

The Second Life CICP Adapter can be configured to include an in-world object called the "assistant" and a Java servlet hosted on the Internet such that it is accessible from Second Life and is also able to open a socket to the gateway. The Second Life CICP adapter can also be configured to generate a graph by executing the following exemplary process.

Step 1: User is an avatar within Second Life. User types "glasshouse init".

Step 2: The "assistant" object is listening to its owner, and receives the "glasshouse init" command.

Step 3: assistant object determines its current x and y position, and the id of its owner.

Step 4: assistant object performs an http get to the servlet, passing "cmd=init", x and y position, and owner id as query string parameters.

Step 5: servlet opens a socket to the gateway and sends "init".

Step 6: servlet receives CICP "root graph" definition and re-transmits it back to the assistant object.

Step 7: assistant object reconfigures itself to display the menu options when it is clicked.

Step 8: user selects the third menu option.

Step 9: assistant object performs an http get to the servlet, passing "cmd=3", current x and y position, and owner id as query string parameters.

Step 10: servlet opens a socket to the gateway and transmits "1,1,3".

Step 11: servlet receives the CICP definition of a graph from the gateway and uses it to build a "cells" hash table containing objects listing the parameters of each node of the graph, and keyed by strings containing the x and y id's of the nodes.

Step 12: servlet returns the value of the highest graph node y-index (call it yMax) and the value of the highest graph node x-index (call it xMax) to the assistant object as result of http get Step 13: assistant object creates a matrix of "gridcell" objects within the virtual world space, positioning them in a grid pattern such that each cell is as wide as the original "width" parameter in the command specified, and ranging from 1 to yMax along the y axis and 1 to xMax along the x axis; each gridcell object is passed the id of the query, as specified in the original parameter Step 14: assistant object is done and returns to its owner Step 15: each gridcell object performs the following:
  a) build a query string specifying owner, query id, y position of itself, and x position of itself
  b) perform an http get over the Internet to the servlet, passing query string
  c) servlet determines y-id and x-id of cell as follows:
     int y-id=(int)Math.round((yPos−ld.startY)/ld.cell_size)
     int x-id=(int)Math.round((xPos−ld.startx)/ld.cell_size)
     (id's are determined by working backward from virtual world position, using query start y and x positions originally passed by assistant object)
  d) servlet looks up cell attribute string from cells hashtable corresponding to this owner and query id, using y-id and x-id as key
  e) servlet returns attribute string to gridcell object as result of http get
  f) gridcell object parses attribute string and sets its brightness, height, and title accordingly Step 16: done.

The Wonderland CICP Adapter can be a "module" written in Java and added into the Wonderland codebase. The module can implement a "GraphCell" class which is a subclass of Cell (an object in the shared 3D space). The GraphCell class can fetch a CICP configuration file via http and use the Java3D API available within Wonderland to add the specified geometry to the scene graph. The GraphCell class can also set up mouse event listeners and display menus to the user, allowing the user to interact with the geometry it creates.

The Wonderland CICP Adapter can be configured to also include a "GraphCellGLO" class which extends the Wonderland "CellGLO" class, resides within the Wonderland server, and handles messaging. The Wonderland CICP Adapter can include a definition of an initial "assistant" instance of GraphCell to be placed into the world upon initialization of the Wonderland client, and a Java program (the "CICP Proxy") which resides on the same machine as an HTTP server. The CICP proxy can write files into a directory where they can be served out by the HTTP server and open sockets to the gateway. Upon login of a user, the following exemplary sequence of steps can be executed to generate a graph at the gateway:

Step 1: The assistant object opens a socket to the CICP Proxy, sending the line "init".

Step 2: The proxy opens a socket to the gateway, transmitting the line "init".

Step 3: The gateway sends back the configuration of the root graph, which is in turn transmitted back to the Wonderland client by the CICP Proxy.

Step 4: The assistant object configures its menu to display the root graph options.

Step 5: The user selects option 3 from the menu.

Step 6: The Wonderland client opens a socket to the CICP Proxy, sending the line "1,1,3"—and the proxy in turns opens a socket to the gateway, re-transmitting the same line.

Step 7: The proxy receives a CICP definition of a graph, and writes it to a file which can be served by the HTTP server.

Step 8: The proxy returns the bounds of the graph, along with the URL of the definition file, to the Wonderland client.

Step 9: The Wonderland client creates a GraphMessage object and sends it to the GraphCellGLO on the Wonderland server; the GraphCellGLO sends the message out to all connected Wonderland clients.

Step 10: Each Wonderland client which is connected to the world receives the GraphMessage and creates a GraphCell object, passing it the message, which includes the URL of the definition file.

Step 11: Each GraphCell object fetches the configuration file using HTTP and then uses Java3D and other API's included in Wonderland to add the graph geometry to the scene graph and set up the listeners required for user interaction, based on the menu options configured in the definition file.

The SQL database may include one table named stock_prices, and offer a JDBC interface for querying. The SQL definition of the stock_prices table is as follows:
create table stock_prices (ticker char(4), year int, quarter int, price double).

An entry in the stock_price table with quarter=0 may represent the average price for the year. The stock_price table contains the following rows as listed in Table 2:

TABLE 2

Stock_price Table

| ticker | year | quarter | price |
|--------|------|---------|-------|
| MSFQ | 1995 | 0 | 12.75 |
| MSFQ | 1995 | 1 | 10 |
| MSFQ | 1995 | 2 | 12 |
| MSFQ | 1995 | 3 | 14 |
| MSFQ | 1995 | 4 | 15 |
| MSFQ | 1996 | 0 | 14.5 |
| MSFQ | 1996 | 1 | 16 |
| MSFQ | 1996 | 2 | 15 |
| MSFQ | 1996 | 3 | 14 |
| MSFQ | 1996 | 4 | 13 |
| MSFQ | 1997 | 0 | 11.5 |
| MSFQ | 1997 | 1 | 12 |
| MSFQ | 1997 | 2 | 12 |
| MSFQ | 1997 | 3 | 11 |
| MSFQ | 1997 | 4 | 11 |
| MSFQ | 1998 | 0 | 13.25 |
| MSFQ | 1998 | 1 | 11 |
| MSFQ | 1998 | 2 | 12 |
| MSFQ | 1998 | 3 | 14 |
| MSFQ | 1998 | 4 | 16 |
| MSFQ | 1999 | 0 | 21.5 |
| MSFQ | 1999 | 1 | 17 |
| MSFQ | 1999 | 2 | 20 |
| MSFQ | 1999 | 3 | 24 |
| MSFQ | 1999 | 4 | 25 |

The application may be a Java application which displays a window with a text field labeled "ticker", a text field labeled "start year", a text field labeled "end year", a text field labeled "adapter address", a text field labeled "origin x,y,z", a text field labeled "cell width", and a button labeled "generate".

Through the application, the user may enter "MSFQ", "1995", "1999", "192.168.1.2:3333", "1,1,1", and "0.5" in the respective fields, and click the "generate" button. The IP address of the machine the application is running on is 192.168.1.3, and the application listens on port 3333. The application may perform the following processing steps:

Step 1: query the database using JDBC and the SQL "select year, price from stock_price where ticker='MSFQ' and year>=1995 and year<=1999 and quarter=0 order by year";

Step 2: read the results from the database into a linked list of objects, keeping track of the highest and lowest prices read (assume lowest price read stored in minprice variable, highest stored in maxprice variable);

Step 3: open a TCP/IP socket to the adapter using the address the user entered ("192.168.1.2");

Step 4: write "return_address 192.168.1.3:3333" to the socket, followed by newline;

Step 5: write "graph 1" to the socket, followed by newline (this is the graph ID);

Step 6: write "node_menu 1,zoom" to the socket, followed by newline;

Step 7: set variable minheight to cell width (in this case 0.5) divided by ten;

Step 8: set variable maxheight to cell width multiplied by 5;

Step 9: loop through the linked list, with variable loopindex ranging from 1 to 5 and for each record do the following:
 a) set variable height to (minheight+(maxheight−minheight)*(price−minprice)/(maxprice−minprice));
 b) set variable xlocation to the x value from the origin the user entered, plus (cell width*(loopindex−1));
 c) write a line to the socket containing the following (substitute actual values for the variable names):
 node    recsolid,loopindex,xlocation,1,1,0.5, height<newline>;

Step 10: write "done 1,1,1,maxX,maxY,maxZ" to the socket followed by newline, where maxX, etc. are the values corresponding to the opposite corner of the entire graph structure from the origin;

Step 11: close socket; and

Step 12: create and retain a structure in memory (the "node-cache") which allows all values pertinent to a given graph node to be retrieved in one object, using graph ID and loop-index (loopindex can also be referred to as node ID) as the key (Hashtable would work for this).

Exemplary text that can be written by the application to the adapter via the above process is illustrated in Table 3:

TABLE 3

| Text written to the adapter |
|---|
| return_address 192.168.1.3:3333 |
| graph 1 |
| node_menu 1,zoom |
| node recsolid,1,1,1,1,.5,.35625 |
| node recsolid,2,1.5,1,1,.5,.785 |
| node recsolid,3,2,1,1,.5,.05 |
| node recsolid,4,2.5,1,1,.5,.47875 |
| node recsolid,5,3,1,1,.5,2.5 |
| done 1,1,1,3.5,2.5,1.5 |

After the application creates the structure, a user within the virtual world can click on a second node within the graph, for example, the one representing the price for 1996, and then select the zoom option from the resulting menu. The adapter may then open a socket to the application (using the IP address and port originally sent by the application in the line that starts with "return_address") and write commands. An example of these commands is provided in Table 4:

TABLE 4

| Commands written to the socket |
|---|
| menu_select 1,2,1 |
| done |

The "1,2,1" following "menu_select" corresponds to the graph ID (1), the node ID (2), and the menu option ID (1), respectively. Upon receipt of the above lines, the application may retrieve the corresponding node object from the node-cache and perform the steps described above to transmit a second graph definition to the adapter. The origin for the graph will be the x,y,z location of the node the user clicked, but with the max height from the first graph+cell width added to the y component. The SQL used in this case is different as well:
select quarter, price from stock_price where ticker='MSFQ' and year=1996 order by quarter.

An example of text written to the adapter is provided in Table 5:

TABLE 5

Text written to the adapter return_address 192.168.1.3:3333
graph 2
node_menu 1,zoom
node recsolid,1,1.5,4,1,.5,2.5
node recsolid,2,2,4,1,.5,1.68334
node recsolid,3,2.5,4,1,.5,.86667
node recsolid,4,3,4,1,.5,.05
done 1.5,4,1,2,6.5,1.5

In this example, the Sun Wonderland Adapter is a modified Sun Wonderland client which listens on a socket for content injection requests. Upon receipt of a content injection request (consisting of lines of text described in the Application Flow section), the customized Wonderland client writes the request into a file which can be retrieved via Hypertext Transfer Protocol (HTTP). The Wonderland client may then send an InjectionCellMessage to the server, with the Uniform Resource Locator (url) of the file and the bounds of the entire graph structure, signaling creation of a new InjectionCell. The bounds consist of two 3D points defined by the two sets of x,y,z values following "done". The server may then send the message out to all connected clients, which causes them to create new InjectionCell objects within the virtual 3D space positioned as directed by the bounds values.

The InjectionCell object within a given Wonderland client may retrieve the url from the message, retrieve the file using the url, and then create InjectionShape objects (e.g., custom subclass of the standard Java3D class "Quad") that are equivalent to the rectangular solids defined by the origin, base width, and height values contained in the file. The InjectionShape objects may each be registered to listen to mouse click events, allowing them to create additional 3D objects representing a menu when clicked by the user.

The menu objects created may also listen to click events, which allows detection of the user selecting a particular menu option. When the selection of a menu option is detected, the Wonderland client may send an InjectionCellClickMessage to the server. The server may send the message out to all clients. The client which received the original socket connection from the application may create a socket connection to the application and send over the identification of each of the graph, node, and menu option that was clicked.

The Second Life Adapter in this example is a Java Servlet which in addition to responding to HTTP requests, may listen on a socket for content injection requests. Upon receipt of a content injection request, the servlet may create a cache of objects corresponding to each "node" line of the request and indexed by x,y,z position. The servlet then may make an XML-Remote Procedure Call (XML-RPC) request to Second Life, invoking code within an object in Second Life called the "assistant" and passing the x,y,z origin values of the graph and the cell width. The assistant object may rezz rectangular solid prim objects in the positions defined by the request. The prim objects are objects that can be displayed as a single geometric shape such as a cube or an ovoid. These objects may contain a script which, upon rezzing, executes an "http get" to the servlet, passing its x,y,z position as request parameters. The servlet may use the x,y,z position passed to retrieve the corresponding node object from the cache, and return the height specified for it in the original content injection request, as well as the node ID, graph ID, and the defined menu options.

The prim in Second Life may then make its height the same as the value received from the servlet, and register itself to provide the appropriate menu options to the user upon click. When the "zoom" menu option is selected, the prim may make an HTTP request to the servlet, passing the graph ID, node ID, and menu option ID. The servlet then may open a socket to the application and write the "menu_select" line described above.

An external entity which has injected content into a virtual world may update the position, color, size, or other attributes of the content, on an object-by-object basis, using streaming features of a Content Injection and Control Protocol.

In a third example, a 3D graph including five rectangular solids may be injected into a virtual world by an external data visualization gateway. The gateway may issue a sequence of commands that cause the virtual world to shift the positions of the rectangular solids, re-ordering them from smallest to largest along the x axis. The initial set of commands issued to create the graph may include the commands as listed in Table 6:

TABLE 6

Commands issued to created the graph return_address 192.168.1.3:3333
graph 1
node_menu 1,zoom
node recsolid,1,1,1,1,.5,.35625
node recsolid,2,1.5,1,1,.5,.785
node recsolid,3,2,1,1,.5,.05
node recsolid,4,2.5,1,1,.5,.47875
node recsolid,5,3,1,1,.5,2.5
done 1,1,1,3.5,2.5,1.5

In this example, the virtual world is an instance of Sun Wonderland that has been modified to use Content Injection and Control Protocol, and that has been programmed to keep a hashtable structure (the "client nodecache") in the memory of each virtual world client computer, allowing the Java objects representing the rectangular solids, along with their respective TransformGroup objects (as described in the next paragraph), to be retrieved via their respective node IDs. The original set of commands created five solids with node IDs ranging from 1 to 5, and the solids will be initially displayed by the virtual world in a row along the x axis, and coincidentally ordered by node ID. The shortest solid (node ID 3) may be in the middle and the tallest (node ID 5) may be at the end.

Within the OpenGL scene graph (e.g., tree structure containing objects describing 3D primitives to be displayed by a given virtual world client computer, and familiar to any person skilled in the art of Java3D programming), each InjectionShape object may represent a particular rectangular solid that has been appended to a TransformGroup object, which contains parameters specifying the point in 3D space where the rectangular solid is located. Changing the position of a given rectangular solid can be accomplished by using the node ID of the solid to retrieve its corresponding TransformGroup object from the client nodecache, and then modifying the attributes of the object that specify position.

The Wonderland may be programmed such that immediately after processing the file of commands listed above, it opens a socket to the address and port specified in the first line (this is the address and port that the external application is listening on). It writes the line "subscribe 1" to the socket (where "1" is the graph ID from the second line of the file of commands). The external application may then transmit the stream of content modification commands back along the socket to the Wonderland client. In place of the simple socket-based protocol described here, any publish and subscribe protocol, or any streaming content mechanism can be used. However, many clients are connected to the Wonderland instance into which the graph has been injected, which determines how many sockets will be opened to the external application in this simple socket-based example.

The external application may send back to each Wonderland client a sequence of commands as listed, for example, in Table 7 (a line below consisting of "pause" and a number n within square brackets represent a pause in transmission of n seconds, and is not literally transmitted):

TABLE 7

Commands sent back to client move 3,2,4,1,1
[pause 1]
move 4,2.5,4,1,1
[pause 1]
move 2,2.5,1,1,1
[pause 1]
move 4,2,4,1,.5
[pause .5]
move 4,2,1,1,.5
[pause .5]
move 1,1.5,1,1,1
[pause 1]
move 3,1,4,1,.5
[pause .5]
move 3,1,1,1,.5

In Table 7, the first number following "move" is the node ID of the solid to be moved, the next three numbers are the x, y, and z components of the 3D point which the node should be moved to, and the final number is the amount of time in seconds over which the shape should be moved (moveTime).

As a result of these commands, the Wonderland client may move the solids in straight lines and without rotation. Additional commands that cause objects in the virtual space to rotate and/or to move along curved paths by specifying an axis point and a rotation amount may be specified.

The Wonderland client may be configured to store a value that indicates the desired number of positional updates per second for any object (e.g., the "updatesPerSec" value). The client may also be configured to create a queue of object update requests, and launch a thread to handle requests in the queue. An update request in the queue may be an object containing a reference to the TransformGroup to be updated, the 3D position at which to place the object being updated, and the earliest time for the update to occur, expressed using a system clock value. As it receives the commands on the socket, the Wonderland client may be configured to perform an update sequence for each command as listed, for example, in Table 8:

TABLE 8

Wonderland client retrieve the TransformGroup object from the client nodecache, using the node ID;

TABLE 8-continued

Wonderland client if object update requests for this object currently exist in the queue, remove all but the last (the last one is the one which has the most recent earliest update time, and would be performed last if they all were left in);
    divide the moveTime value for the new command by the updatesPerSec value, with the result being the number of chunks to break this move into;
    plot a line between the prior position of the object (prior position is the position specified by the last object update request in the queue, if one exists, or the TransformGroup for the object, if no request is in the queue);
    divide the line by the number of desired chunks, resulting in a series of update requests which move the object to the position specified by the new command, over the course of time specified by the command; and
    add the update requests to the queue.

The thread servicing the update request queue may periodically inspect update requests in the queue (inspecting the first entry for each object). If the system clock is later than the earliest update time of an inspected update request, the thread may pull out the request and set the corresponding TransformGroup to the position specified in the request.

The purpose of the queueing mechanism is to allow a smooth motion of objects from their existing positions to the positions specified by new CICP Stream commands, and to automatically catch up to new positions if system lag is experienced.

It will be appreciated by those skilled in the art that exemplary embodiments can be embodied in other specific forms without departing from the spirit or essential characteristics thereof. The presently disclosed embodiments are therefore considered in all respects to be illustrative and not restricted.

What is claimed is:

1. A method of establishing a gateway between a database and a virtual world, the method comprising:
    receiving at a gateway from virtual world a command to generate a three dimensional representation of data, the command including first parameters and second parameters;
    constructing a query string based on said command and said first parameters;
    transmitting said query string to a database;
    in response to said query string, receiving data at the gateway from the database such that the received data represents a result of querying the database with said query string;
    generating one or more definitions of objects configured to be instantiated in the virtual world, the definitions being based on said received data and second parameters; and
    outputting said definitions for instantiation in the virtual world.

2. The method of claim 1, wherein the definitions represent all of the received data and all of the second parameters.

3. The method of claim 1, wherein the definitions are configured to be instantiated as three-dimensional representations in the virtual world.

4. The method of claim 3,
    wherein the command includes a designation of a style of visualization for the definitions; and
    wherein the definitions include objects representing one or more bar graphs, one or more line graphs, one or more pie charts, or one or more topographic maps.

5. The method of claim 1, further comprising:
creating one or more first definitions which store unique identification corresponding to elements of the visual representation;
creating one or more second definitions which respectively correspond to the one or more first definitions; and
storing the retrieved data in the one or more second definitions.

6. The method of claim 5, wherein the one or more first definitions are arranged into one or more linked lists.

7. The method of claim 6, wherein the one or more second definitions are arranged into one or more hash tables.

8. The method of claim 7, further comprising:
sorting part or all of the retrieved data using the one or more second definitions and the respectively corresponding one or more first definitions.

9. The method of claim 5, further comprising:
assigning one or more graph node identifications;
creating one or more graph node objects respectively corresponding to the one or more graph node identifications; and
storing the parameters, the one or more first definitions, and the one or more second definitions in the one or more graph node objects.

10. The method of claim 1, wherein the database is a spreadsheet.

11. A method for injecting and controlling content from an application into a virtual world, the method comprising:
placing content in the virtual world by an application implementing a protocol;
receiving at a gateway from the virtual world one or more messages from the content when the content is interacted with, the one or more messages including a command to generate a three dimensional representation of data, the command including first parameters and second parameters;
constructing one or more query strings based on the messages from the content with the command and the first parameters;
querying a database with the query strings;
receiving data at said gateway from the database based on the query strings;
dynamically creating definitions of instantiatable content based on the received data, the instantiatable content configured to be instantiated in the virtual world, the definitions being based on said received data and said second parameters; and
responding to the one or more messages by outputting said instantiatable content for instantiation in the virtual world by causing one or more changes in the content and/or by producing additional content.

12. The method of claim 11, wherein the one or more changes in the content are based on messages sent to the content.

13. The method of claim 11, wherein the application implementing the protocol is included in the virtual world.

14. The method of claim 11, wherein the application implementing the protocol comprises an application that communicates with the virtual world.

15. The method of claim 14, wherein the application that communicates with the virtual world comprises a customized virtual world client.

16. The method of claim 11, wherein the application implementing the protocol interfaces with a gateway between a database and the virtual world; and
wherein the gateway transmits information related to the content to the application implementing the protocol.

17. The method of claim 16, wherein the one or more messages from the content when the content is interacted with are communicated to the gateway.

18. The method of claim 17, wherein the responding to the one or more messages is based on information that is generated by the gateway and transmitted to the application implementing the protocol.

19. The method of claim 11, wherein the information transmitted by the gateway to the application implementing the protocol comprises one or more graphs, and information related to a menu listing of further graphs which may be generated.

20. The method of claim 19, wherein the information related to a menu listing of further graphs is obtained from a configuration file of the gateway.

21. The method of claim 20, further comprising displaying the one or more graphs and the menu listing in the virtual world.

22. The method of claim 21, wherein the placing the content in the virtual world comprises displaying the one or more graphs and the menu listing in the virtual world;
wherein the receiving one or more messages from the content comprises receiving a menu selection from the menu listing by the gateway; and
wherein the responding to the one or more messages comprises generating information related to modifications to the content from the gateway, communicating the information related to the modifications of the content to the application implementing the protocol, and displaying visual representation based on the modifications of the content in the virtual world.

23. A method for injecting and controlling content from an application into a virtual world, the method comprising:
receiving a command and first parameters and second parameters from an application implementing a protocol for placing content in the virtual world, the commands being received at a gateway and the command relating to generating a three dimensional representation of data;
formulating a database query string based on the received command and first parameters;
querying a database with the database query string;
receiving data from the database at the gateway based on the database query string such that the received data represents a result of querying the database with said query string;
sending the received data to the application implementing the protocol;
dynamically building a visual representation of the received data including generating one or more definitions of objects configured to be instantiated in the virtual world, the definitions being based on said received data and second parameters;
building a visual representation of interactions available to a user for interaction with the visual representation of the received data; and
rendering the visual representation of the received data and the visual representation of the available interactions in the virtual world.

24. The method of claim 23, further comprising:
selecting an interaction from the associated available interactions in the virtual world;
receiving information related to the selected interaction by the application implementing the protocol;
sending the information related to the selected interaction from the application implementing the protocol to the gateway;

querying the database by the gateway using the database query string modified by the information related to the selected interaction;

obtaining a second set of data based on the modified database query string;

sending the second set of data to the application implementing a protocol; and rendering one or more changes to the visual representation based on the second set of data.

25. The method of claim 24, wherein the database query string modification comprises adding parameters to the database query string, the parameter being based on the information related to the selected interaction.

26. The method claim 23, wherein rendering the visual representation comprises a graph and one or more nodes associated with the graph.

27. The method of claim 26, wherein when one of the nodes is selected, a title associated with the selected node is rendered in the virtual world.

28. The method of 27, wherein when the title is selected, a menu associated with the title and one or more of the available interactions are rendered in the virtual world.

29. The method of 23, wherein the database is a spreadsheet.

30. A method of injecting and streaming content control from an application into a virtual world, the method comprising:

placing content in a virtual world by an application implementing a protocol by a gateway;

receiving at a database one or more messages includes a query string based on a command relating to streamed content control and first parameters from the gateway in which the query string is based on a command and first parameters related to the content when the content is interacted with;

receiving data at the gateway from the database such that the received data represents a result of querying the database with said query string;

dynamically generating one or more definitions of objects configured to be instantiated in the virtual world, the definitions defining a visual representation of the data from the database, the definitions being based on said received data and second parameters; and new content control for said virtual world.

31. The method of claim 30, wherein the content comprises one or more objects.

32. The method of claim 31, wherein each of the objects is associated with one or more transformative objects.

33. The method of claim 32, wherein each of the transformative objects corresponds to one of the one or more messages from the content.

34. The method of claim 33, wherein when the one of the one or more messages from the content is received, a transformative object corresponding to the one of the one or more messages replaces an object associated with the transformative object in the content.

35. A method for injecting and controlling content from an application into a virtual world, the method comprising:

receiving at a gateway from a virtual world a command with a designation of a grid type, the command including first and second parameters relating to desired three dimensional content to be instantiated in the grid;

generating a first query string based on the command and the first parameters;

querying a database based on the first query string;

receiving at the gateway a response from the database with content pertaining to the results of querying the database;

determining minimum and maximum dimensions of the content;

generating one or more definitions of objects configured to be instantiated in the virtual world, the definitions being based on said received data and second parameters, the generating the one or more definitions including:

instantiating a grid of cells based on the minimum and maximum dimensions of the content;

for each cell in the grid,
constructing another query string for the database with specific parameters relating to the location of the cell in the grid;
querying the database based on the another query string; and
receiving cell-specific content from the database; and
combining the cell-specific content for the cells in the grid into an instantiable object definition; and sending the instantiable object definition to the virtual world for instantiation.

* * * * *